United States Patent

Nelson

[11] Patent Number: 6,077,006
[45] Date of Patent: Jun. 20, 2000

[54] HANDLE POSITIONER FOR FREIGHT CONTAINER TWISTLOCK

[75] Inventor: Jim Nelson, Saint Augustine, Fla.

[73] Assignee: Buffers USA Inc., Jacksonville, Fla.

[21] Appl. No.: 09/302,496

[22] Filed: Apr. 30, 1999

Related U.S. Application Data

[60] Provisional application No. 60/083,748, May 1, 1998.

[51] Int. Cl.[7] .......................................................... B60P 7/08
[52] U.S. Cl. ................................................ 410/82; 410/76
[58] Field of Search .................................. 410/73, 76, 82, 410/83; 24/287; 248/500, 503

[56] References Cited

U.S. PATENT DOCUMENTS

| 3,737,135 | 6/1973 | Bertolini .................................... 410/82 |
| 4,047,748 | 9/1977 | Whaley et al. ............................. 410/82 |
| 4,697,967 | 10/1987 | Schulz et al. .............................. 410/82 |
| 5,765,977 | 6/1998 | Reynard ..................................... 410/82 |

*Primary Examiner*—Stephen T. Gordon
*Attorney, Agent, or Firm*—Browdy and Neimark

[57] ABSTRACT

A freight container twistlock device for engaging a carrier to a freight container. The device having a housing, a shear block engaged on a top of the housing, a stem engaged to a twistlock head, and passing through both the housing and the shear block, a handle engaged to an end of the stem opposite to the twistlock head to rotate the twistlock head into a locked or unlocked position relative to the freight container, a roll pin fixed to the stem within the housing, and an adjustable handle positioner selectively engaged in the housing to limit turning of the handle when engaged by the roller pin from an open position of the handle to a closed position of the handle from either a left side of the open position or a right side of the open position.

7 Claims, 4 Drawing Sheets

HANDLE POSITIONER FOR FREIGHT CONTAINER TWISTLOCK

CROSS REFERENCE TO RELATED APPLICATIONS

This application claims the benefit of U.S. provisional application No. 60/083,748, filed May 1, 1998. The contents of which are hereby incorporated by reference.

BACKGROUND OF THE INVENTION

1. Field of the Invention

A twistlock for engaging a freight container to a load carrier for transport having a handle positioner which limits turning of a locking stem of the twistlock to two difference angles. The handle positioner is located inside the twistlock housing and is designed so that it can selectively control the movement of the operating handle to lock and unlock the twistlock, either to the left or the right of the open position of the operating handle.

2. Prior Art

Twistlocks to lock down freight containers to ships, rail cars, road chassis and other load carriers such as flatracks, have been in use since the design of the ISO freight container some 49 years ago. It has always been important to know if the twistlock is locked or unlocked to the freight container when in service. One of the possibilities for determining whether the twistlock is locked or unlocked has been to observe the position of the locking handle. On a road chassis, that typically has four or eight locks equally spaced on both sides of the vehicle, it is desirable that the locking handle point out to the adjacent side of the carrier when unlocked and either forward or to the rear of the carrier when locked. Due to the fact that twistlocks on load carriers for road operation must be fitted and operated from each side of the carrier, the twistlocks have been made both right locking and left locking. The manufacturer of the load carrier decides if the handle should point forward or to the rear when locked, but in either case, half of the locks have been made right locking and half, left locking.

OBJECT AND SUMMARY OF THE INVENTION

The invention makes it possible for the manufacturer of the load carrier to buy only one type of twist lock and thus avoid inventory imbalances and mistakes when fitting a handed lock. The invention permits the user of the twistlock to use the inventive twistlock lock on either the left or right side of the load carrier and position the operating handle to lock either left or right after the lock is fixed to the carrier. This gives maximum flexibility and a desirable elimination of all potential fitting mistakes.

To position the twistlock to be either left or right operated on the carrier, the handle positioner is placed in one of two alternative positions inside the twistlock house. To change the position of the handle positioner and thereby the left or right locking of the twistlock, the stem assembly is lifted out of the twistlock house and the novel handle positioner element is rotated 90°. The handle positioner is typically square and is kept in position by the inside width of the twistlock housing. A rollpin fixed through the twistlock stem creates the twist stop positions for the stem in interaction with the shape of the handle positioner.

DETAILED DESCRIPTION OF THE PREFERRED EMBODIMENT(S) OF THE INVENTION

Figure 1:
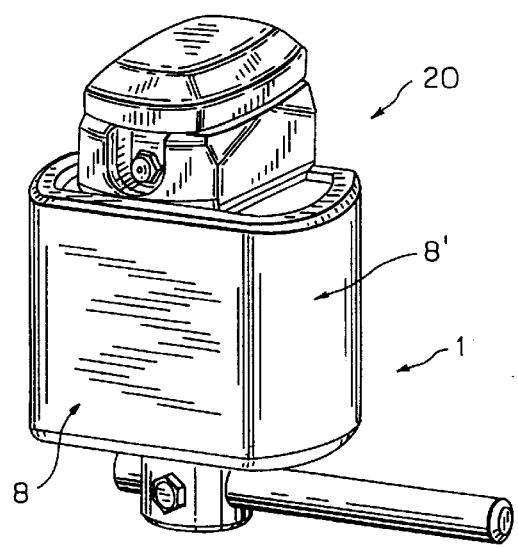
FIG. 1 shows a perspective view of the twistlock according to the invention in an unlocked position on its housing.
Figure 2:
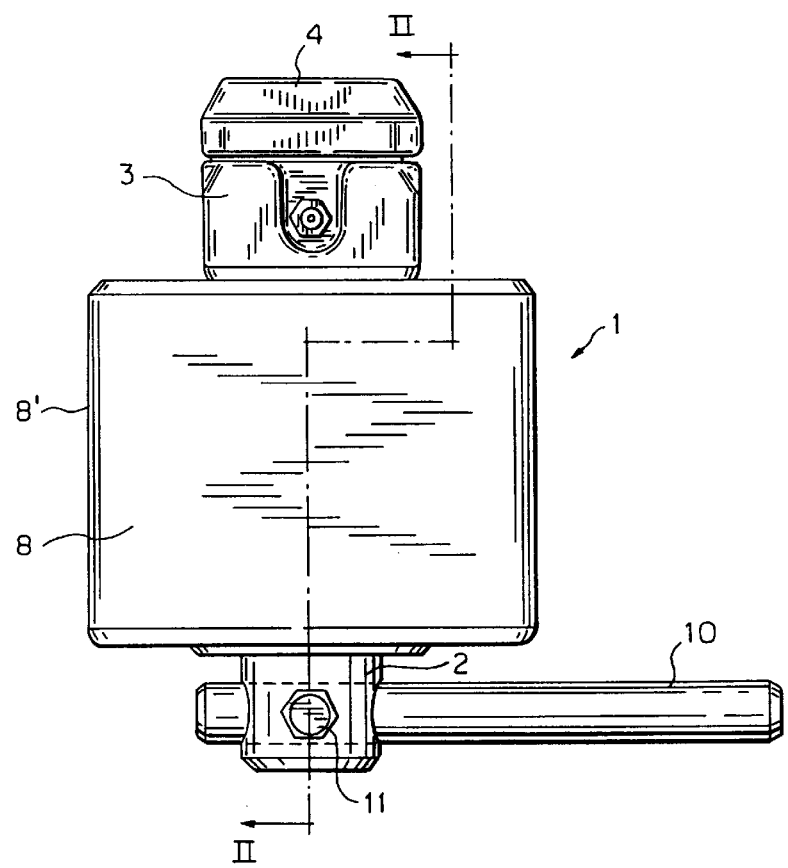
FIG. 2 shows a front elevation view of the twistlock of FIG. 1.
Figure 3:
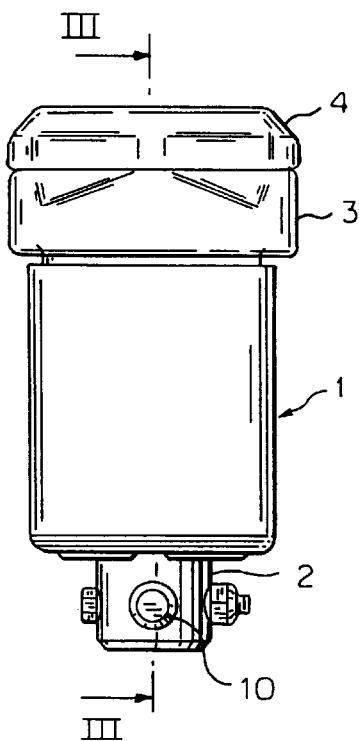
FIG. 3 shows a side elevation view of the twistlock of FIG. 2.
Figure 5:
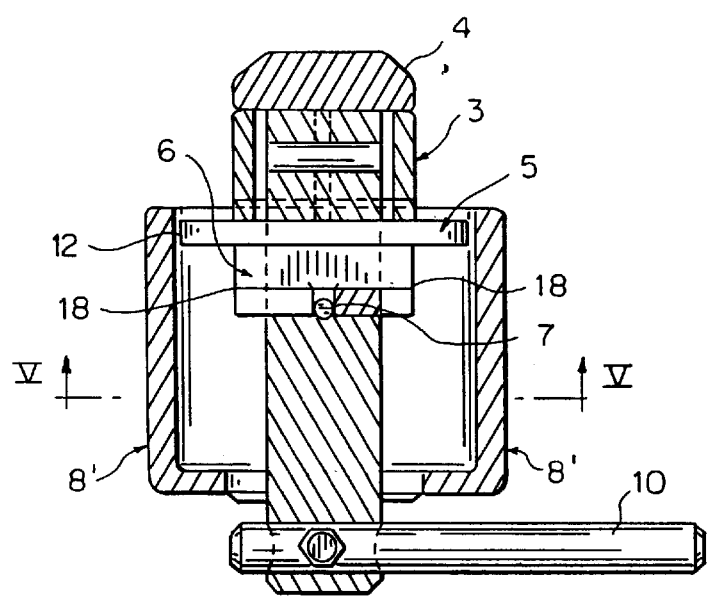
FIG. 5 shows a vertical cross sectional view along section III—III through the twistlock of FIG. 3.
Figure 8:
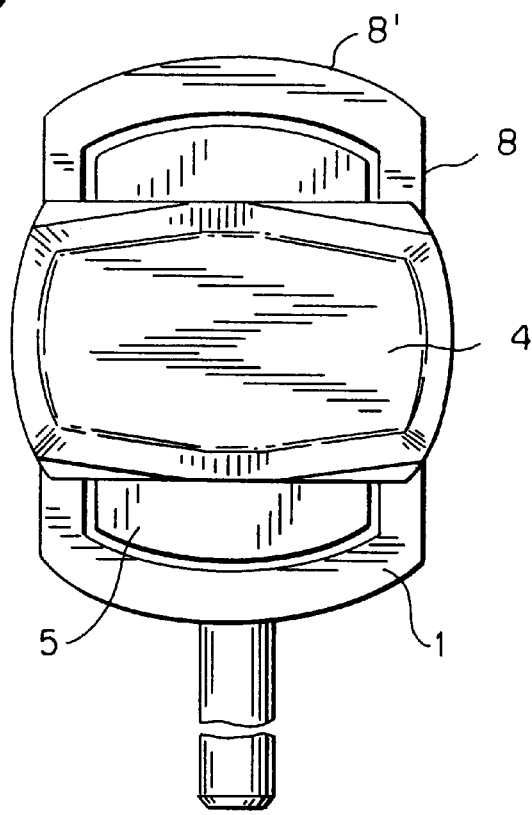
FIG. 8 shows a top plane view of the twistlock of FIG. 2.

FIGS. 1 and 2 show the exterior of twistlock 20 having a housing 1, a stem 2 rotatably passing through both housing 1 and shear block 3, to engage twistlock 4. Handle 10 is engaged to stem 2 by nut and bolt 11 to enable turning of stem 2 and twistlock head 4 into a locked position in engagement to a freight container (not shown) or an unlocked position as shown in FIG. 1. The exterior elements described are conventional and are not directed to the primary inventive concept of the invention.

FIGS. 4–8 show the interior of housing 1 being occupied by a guide plate 5 corresponding in shape to the opening 12 at the top of housing 1 below shear block 3. Guide plate 5 separates handle positioner 6 from shear block 3 and both guide plate 5 and handle positioner 6 are slidably engaged to the longitudinal walls 8 of housing 1 from the bottom of the housing 1 to opening 12 at the top of housing 1. At the same time stem 2 is rotatable in to both said guide plate 5 and handle positioner 6 as it respectively passes through corresponding through holes 5' and 6' in guide plate 5 and handle positioner 6. Roll pin 7 shown engaged through stem 2 is intended to engage handle positioner 6 to create twistlock stop positions on handle positioner 6 when turning the stem 2 in relation to the shape of the handle positioner 6.

Figure 4:
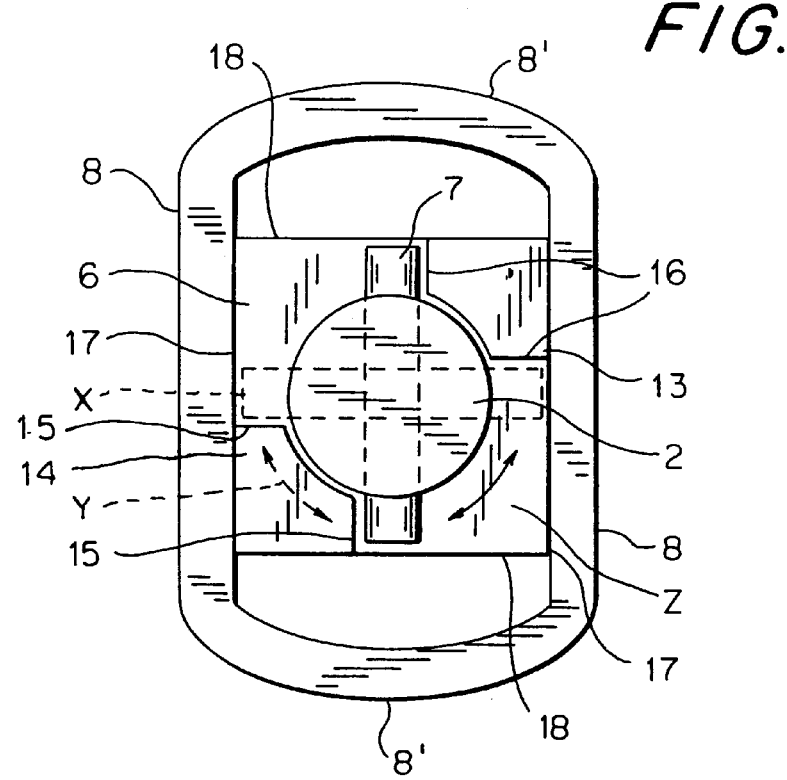
FIG. 4 shows a horizontal cross sectional view along section II—II through the twistlock of FIG. 2.
Figure 6:
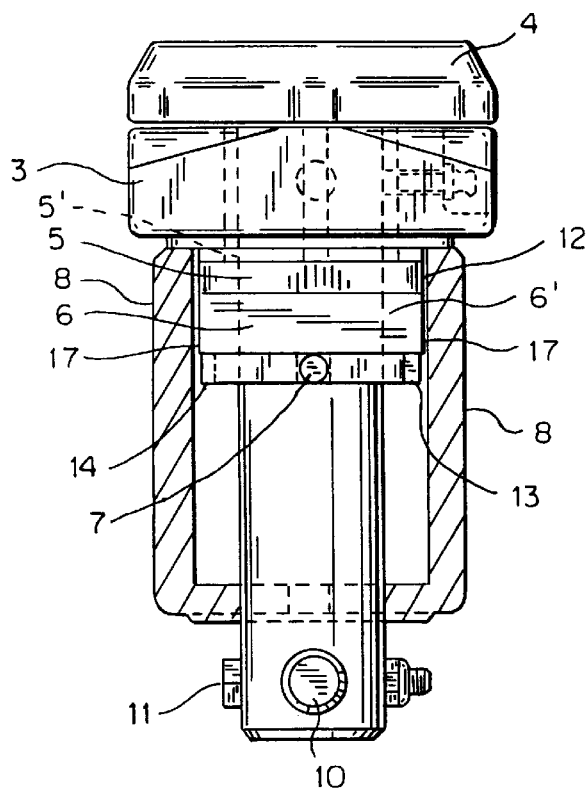
FIG. 6 shows a partial vertical cross sectional view along section V—V through the twistlock of FIG. 5.
Figure 7:
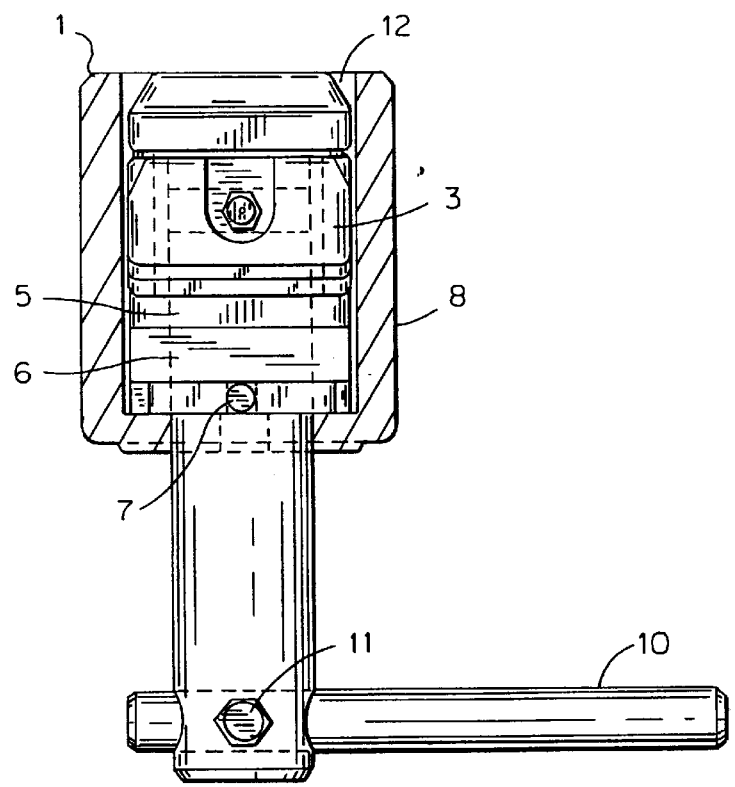
FIG. 7 shows a vertical cross sectional view through the twistlock according to the invention with the shearblock and twistlock head retracted into the housing of the twistlocks.

As best seen in FIGS. 4, 6 and 7 handle positioner 6 is substantially square with opposite walls 17 abutting the longitudinal walls 8 of housing 1 (see FIG. 4) while opposite walls, 8' are spaced apart from the transverse walls 8 of housing 1 (see FIG. 1). This configuration precludes handle positioner 6 from turning while engaged in housing 1 by roller pin 7 on stem 2. The top surface of handle positioner 6 is substantially flat and normally abuts the underside of guide plate 5. The underside of positioner 6, however, is shaped to provide the stop positions noted above. The underside of handle positioner 6 is primarily flat as is the top surface with the exception of two projections 13 and 14 extending away from the underside of positioner 6. An extension of walls 15 and 16 of projections 13 and 14 would intersect in a 90° angle. Accordingly, walls 15 and 16 serve as the stop position for turning roll pin 7 and stem 2.

As better seen in FIG. 4, projections 13 and 14 serve to engage roller pin 7 projecting from the sides of stem 2 to limit its turning of the stem to a 90° angle between walls 15 and 16 of projections 13 and 14. As seen, turning of roller pin 7 occurs below the flat underside of positioner 6 as shown in FIGS. 4 and 6. As noted, handle positioner 6 cannot be turned in housing 1 as opposite walls 17, 17 of positioner 6 abut the longitudinal walls 8, 8 of housing 1. However, to change the 90° arc of turning of stem 2 to that opposite of the solid arc Z shown, the user can disengage the handle 5 from stem 2 and then remove stem 2, along with shear block 3, guide plate 5 and handle positioner 6 from housing 1. This permits the user to rotate handle positioner 6, 90° so as to move projections 13 and 14 to a second position within housing 1. This is achieved when the positioner 6 is then replaced in housing 1 with opposite walls 18, 18 of the positioner 6 abutting the longitudinal walls 8,8 of housing 1. This will result in roll pin 7 occupying the position X within the dashed lines in FIG. 4 and limit the turning of stem 2 to the 90° dashed arc Y opposite to the solid arc Z shown in FIG. 4. Of course, in this second position handle positioner 6 is unable to turn in housing 1 due to abutting walls 18, 18 against longitudinal walls 8, 8. In other words, the handle positioner 6 depending on which of the two positions it occupies in housing 1 limits the movement of operating handle 5 to lock and unlock the twistlock either to the left or the right of the open position of the handle shown in FIGS. 1 and 8.

FIG. 7 shows that twistlock head 4 and shear block 3 can be retracted into housing 1 along with guide plate 5 and handle positioner 6 for storage and handling purposes if so desired.

The foregoing description of the specific embodiments will so fully reveal the general nature of the invention that others can, by applying current knowledge, readily modify and/or adapt for various application such specific embodiments with out departing from the generic concept, and therefore such adaptations and modifications are intended to be comprehended within the meaning and range of equivalents of the disclosed embodiments. It is to be understood that the phraseology or terminology herein is for the purpose of description and not of limitation.

I claim:

1. A freight container twistlock device for engaging a carrier to a freight container, said twistlock comprising:

a housing;

a shear block engaged on a top of said housing;

a stem engaged to a twistlock head, and passing through both said housing and said shear block;

a handle engaged to an end of said stem opposite to said twistlock head to rotate said twistlock head into a locked or unlocked position relative to said freight container;

a roll pin fixed to said stem within said housing; and an adjustable handle positioner selectively engaged in said housing to limit turning of said handle when engaged by said roller pin from an open position of said handle to a closed position of said handle from either a left side of said open position or a right side of said open position.

2. The twistlock according to claim 1, wherein said adjustable handle positioner is substantially square with a first pair of opposite sides and a second pair of opposite sides thereof wherein each pair of said first pair of opposite sides and said second pair of opposite sides is adapted to be engaged to two opposite walls of said housing.

3. The twistlock according to claim 2, wherein said adjustable handle positioner has two projections extending away from a bottom side thereof;

said two projections respectively positioned at diagonally opposite corners of said positioner.

4. The twistlock according to claim 3, wherein each of said two projections have side walls which engage said roll pin when said stem is turned by said handle.

5. The twistlock according to claim 4 wherein a turning area is provided for said roll pin between opposite one of said side walls of said two projections.

6. The twistlock according to claim 5, wherein said handle positioner can be removed from said housing and rotated 90° and engaged to said opposite walls of said housing by either said first pair or opposite sides of said second pair of opposite sides to rotate said turning area and said two projections to different positions within said housing.

7. The twistlock according to claim 5 wherein the turning area forms an angle of 90°.

* * * * *